United States Patent
Walls et al.

(10) Patent No.: US 8,345,148 B2
(45) Date of Patent: Jan. 1, 2013

(54) METHOD AND SYSTEM FOR INVERSE TELECINE AND SCENE CHANGE DETECTION OF PROGRESSIVE VIDEO

(75) Inventors: Frederick Walls, Norristown, PA (US); Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1104 days.

(21) Appl. No.: 11/936,539

(22) Filed: Nov. 7, 2007

(65) Prior Publication Data

US 2009/0115845 A1  May 7, 2009

(51) Int. Cl.
*G06T 7/20* (2006.01)
(52) U.S. Cl. .......................... 348/352; 348/448; 382/173
(58) Field of Classification Search .................. 348/352, 348/448
See application file for complete search history.

(56) References Cited

U.S. PATENT DOCUMENTS

| | | | | |
|---|---|---|---|---|
| 4,591,908 | A * | 5/1986 | Hirano | 375/240.14 |
| 5,337,154 | A * | 8/1994 | Dorricott et al. | 348/448 |
| 6,061,471 | A * | 5/2000 | Coleman, Jr. | 382/173 |
| 7,241,864 | B2 * | 7/2007 | Inouye | 530/350 |
| 8,107,571 | B2 * | 1/2012 | Sullivan et al. | 375/350 |
| 2002/0106018 | A1 * | 8/2002 | D'Luna et al. | 375/240.01 |
| 2007/0291169 | A1 * | 12/2007 | Eymard et al. | 348/452 |
| 2007/0296855 | A1 * | 12/2007 | Jia et al. | 348/441 |
| 2009/0115845 | A1 * | 5/2009 | Walls et al. | 348/135 |
| 2009/0195691 | A1 * | 8/2009 | Wyman | 348/452 |

* cited by examiner

*Primary Examiner* — Khanh Dinh
(74) *Attorney, Agent, or Firm* — Thomas|Horstemeyer, LLP

(57) ABSTRACT

Certain aspects of a method and system for inverse telecine and scene change detection of progressive video may include determining a cadence, for example, 3:2 or 2:2 pulldown, and phase of received progressive input pictures. A difference between two or more consecutive received progressive input pictures may be determined. The motion compensation of a plurality of output pictures may be controlled based on the determined cadence, phase and difference between two or more consecutive received progressive input pictures. The system may be enabled to determine repeated pictures and scene changes. The motion compensation of output pictures may be stopped during detected scene changes.

25 Claims, 10 Drawing Sheets

METHOD AND SYSTEM FOR INVERSE TELECINE AND SCENE CHANGE DETECTION OF PROGRESSIVE VIDEO

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for inverse telecine and scene change detection of progressive video.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

An artifact known as "motion judder" may occur when the picture rate of a video sequence is excessively low. Motion judder may occur when the temporal sampling rate is too low to describe motion in a scene. The objects in input pictures may be shifted on either side of a required output picture. A temporal digital filter interpolation method may be used to determine pixel intensity values. The signals describing motion of each of the objects within a scene may be referred to as motion vectors. Each pixel or region with the same movement may be allocated a motion vector. The motion estimation system may determine these motion vectors and failing to find a correct motion vector and/or misusing the motion vector in a picture rate converter may lead to noticeable artifacts. When large camera movements occur, regions of a picture close to the borders may have significantly less reliable motion vectors than those closer to the middle and special processing may be required at the picture boundaries.

Telecine is a process that may be used to transfer film sequences to television. Telecine may involve a vertical low-pass Kell-factor filtering of a source image followed by a frame-rate conversion through field repetition. For NTSC, the first 3 fields may be received from the first film frame, followed by 2 fields from the second film frame, followed by 3 fields from the third film frame and so on. The non-uniformity of frames may cause motion judder. In cases where the telecine transfer maps the same number of fields to a single frame, a blurring or stuttering phenomenon may be present because of low temporal resolution of the source images and the near-simultaneous display of two temporally-disparate images.

Interlaced video comprises of fields, each of which may be captured at a distinct time interval. A pair of fields, for example, a top field and a bottom field may be considered to comprise a frame. The pictures forming the video comprise a plurality of ordered lines. During one of the time intervals, video content for the even-numbered lines may be captured. During the other time interval, video content for the odd-numbered lines may be captured. The even-numbered lines may be collectively known as the top field, while the odd-numbered lines may be collectively known as the bottom field. Alternately, the odd-numbered lines may be collectively known as the top field, while the even-numbered lines may be collectively known as the bottom field.

In the case of progressive video frames, all the lines of the frame may be captured during one time interval. Interlaced video may comprise fields that were converted from progressive frames. For example, a progressive frame may be converted into two interlaced fields by organizing the even numbered lines into one field and the odd numbered lines into another field.

When encoding frame pictures, an encoder may utilize coding methods that treat frames as progressive video. These are generally referred to as progressive coding tools. It may be desirable to make the optimum choice between field and frame coding for every field or every pair of fields. The 3:2 pulldown video may comprise a pattern wherein some fields from the original content may be repeated two fields after their first occurrence, forming TBT (top bottom top) or BTB (bottom top bottom) patterns. When encoding video comprising a 3:2 pulldown pattern, it may be desirable to detect and reverse the 3:2 pulldown pattern to reconstruct the video, for example, 24 frames per second progressive video before encoding, and to encode the resulting frames of video using progressive coding tools.

Traditional 3:2 pulldown detectors measure the similarity of fields of the same polarity, for example, top (T) and T or bottom (B) and B, two fields apart, and may utilize this similarity measure to decide whether the current video input follows a 3:2 pulldown pattern or not. In 3:2 pulldown, the first and third fields of the TBT and BTB frames are theoretically identical, although they may be affected by noise.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for inverse telecine and scene change detection of progressive video, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for inverse telecine and scene change detection of progressive video. Certain aspects of a method may comprise determining a cadence, for example, 3:2 or 2:2 pulldown, and phase of received progressive input pictures. A difference between two or more consecutive received progressive input pictures may be determined. The motion compensation of a plurality of output pictures may be controlled based on the determined cadence, phase and difference between two or more consecutive received progressive input pictures. The system may be enabled to determine repeated pictures and scene changes. The motion compensation of output pictures may be stopped during detected scene changes.

Figure 1A:
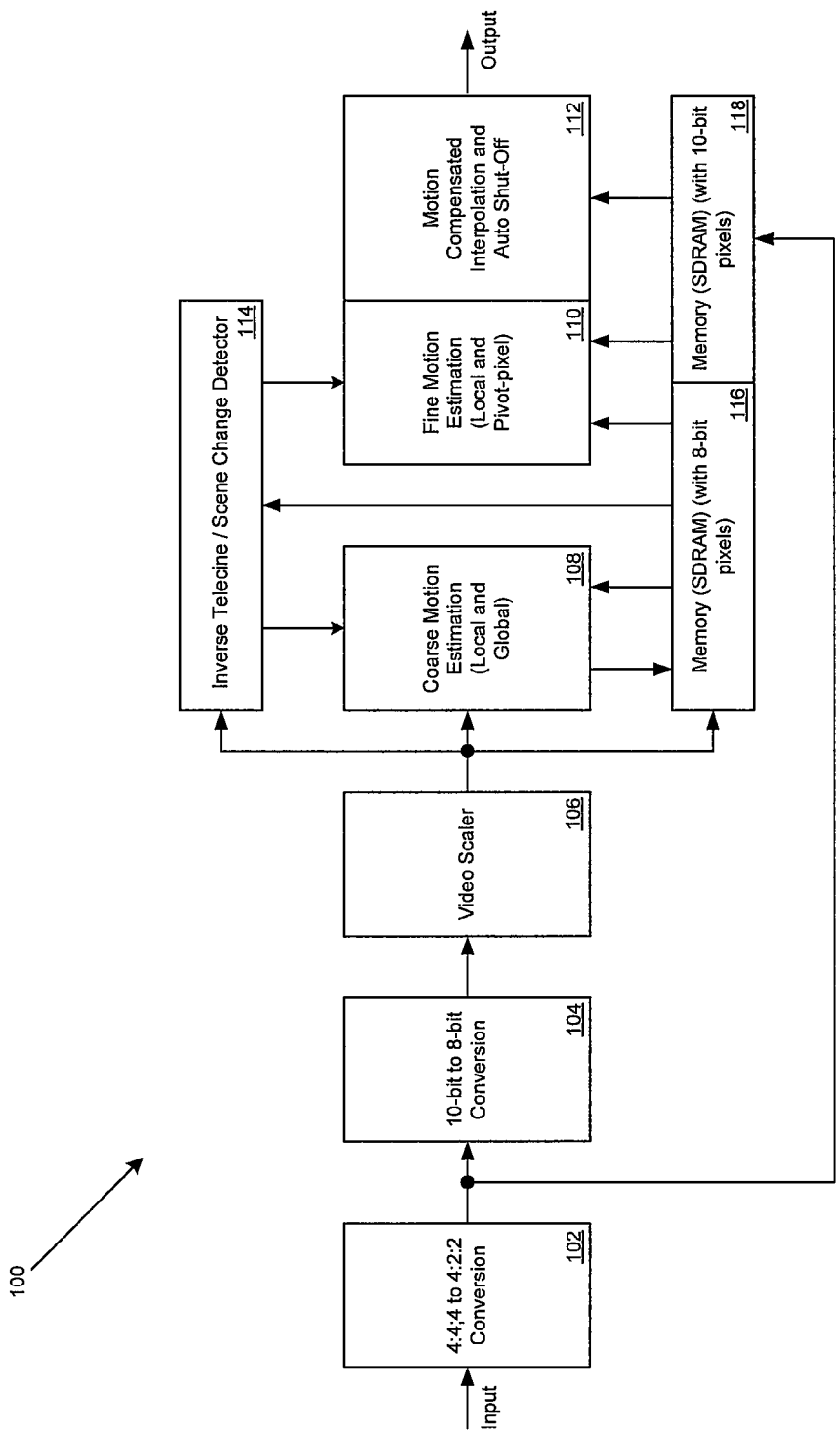
FIG. 1A is a block diagram of an exemplary motion judder cancellation system, in accordance with an embodiment of the invention.

FIG. 1A is a block diagram of an exemplary motion judder cancellation system, in accordance with an embodiment of the invention. Referring to FIG. 1A, there is shown a motion judder cancellation system 100. The motion judder cancellation system 100 may comprise a video conversion block 102, a bit conversion block 104, a video scaler 106, a coarse motion estimation block 108, a fine motion estimation block 110, a motion compensated interpolation and auto shut-off block 112, an inverse telecine block 114, a memory portion with 8-bit pixels 116 and a memory portion with 10-bit pixels 118.

The video conversion block 102 may comprise suitable logic, circuitry and/or code that may be enabled to convert the received video in 4:4:4 format to 4:2:2 format. The bit conversion block 104 may comprise suitable logic, circuitry and/or code that may be enabled to convert received 10-bit video data to 8-bit video data, for example. The video scaler 106 may comprise suitable logic, circuitry and/or code that may be enabled to scale the received 8-bit video data by modifying the resolution of the received video data and generate a scaled video output to the inverse telecine block 114, the coarse motion estimation block 108 and the memory portion with 8-bit pixels 116.

The inverse telecine block 114 may comprise suitable logic, circuitry and/or code that may be enabled to detect a cadence with 3:2 pulldown and/or 2:2 pulldown and perform motion estimation on the received picture. The inverse telecine block 114 may be enabled to detect scene changes in the received video pictures and determine whether to repeat pictures for the duration of the scene change. The inverse telecine block 114 may be enabled to pair incoming frames to determine a source frame rate and pulldown phase to facilitate motion-compensated conversion from the source frame rate to the output frame rate.

The memory region with 8-bit pixels 116 may comprise suitable logic, circuitry and/or code that may be enabled to receive and store the scaled video input and the generated local and global motion vectors. The memory region with 8-bit pixels 116 may comprise suitable logic, circuitry and/or code that may be enabled to output the generated local and global motion vectors to the inverse telecine block 114 and the fine motion estimation block 110. The memory region with 10-bit pixels 118 may comprise suitable logic, circuitry and/or code that may be enabled to receive and store the converted input video. The memory region with 10-bit pixels 118 may be enabled to output the converted input video to the fine motion estimation block 110 and the motion compensated interpolation and auto shut-off block 112.

The coarse motion estimation block 108 may comprise suitable logic, circuitry and/or code that may be enabled to generate block motion vectors and a global motion vector and determine the interpolation and filtering modes based on the received scaled input pictures. The coarse motion estimation block 108 may be enabled to accumulate the plurality of block motion vectors in order to estimate a global motion vector (GMV). The coarse motion estimation block 108 may be enabled to sort motion vectors into a histogram and generate the GMV.

The input video data may be a video sequence at a picture rate of X Hz, for example. The output generated may be a video sequence at a picture rate of Y Hz, for example, where $Y \geq X$ and Y may match the display picture rate. The coarse motion estimation block 108 may be enabled to utilize a motion vector search algorithm to track motion of objects from one picture to the next picture. The coarse motion estimation block 108 may be enabled to split local and global motion search functions in order to generate candidate motion vectors and their corresponding cost measures.

In accordance with an embodiment of the invention, if a picture does not correspond to a scene change, each block in the picture may be associated with a local motion vector $(v_x, v_y)$. These local motion vectors, which may have sub-pixel resolution, may be combined together to build a vector field. The local motion search function may determine the forward and backward motion vectors for a given block location, where each vector may have a corresponding cost, for example, sum of absolute differences (SAD). Notwithstanding, the block size for motion estimation may vary, for example, 4×4 or 8×8.

For example, in a scene where a camera follows an airplane flying over a cloudy sky. The global motion may comprise a pan of the camera as it follows the airplane, and the airplane itself may be the object where motion may differ from global motion. A global motion vector may be derived based on a measure of global motion by collecting statistics, for example, a histogram of local motion vectors. Alternatively, the global motion vector may be approximated based on a pixel transformation, such as:

$$v_x = a_{11}x + a_{12}y + b_1$$

$$v_y = a_{21}x + a_{22}y + b_2$$

where (x,y) and $(v_x,v_y)$ may indicate the position and motion, respectively. The parameters $a_{11},a_{12},b_1$ and $a_{21},a_{22},b_2$ may be estimated by local motion vector samples using a least squares method, for example.

The fine motion estimation block 110 may comprise suitable logic, circuitry and/or code that may be enabled to refine the motion vectors extracted from the received video stream and decompose the block motion vectors into pixel motion vectors. The fine motion estimation block 110 may be enabled to perform a local refinement search and the motion vectors may be refined to sub-pixel precision, for example. The fine motion estimation block 110 may be enabled to accumulate the plurality of block motion vectors in order to estimate a global motion vector (GMV). The fine motion estimation block 110 may be enabled to sort motion vectors into a histogram and generate the GMV.

The motion compensated interpolation and auto shut-off block 112 may comprise suitable logic, circuitry and/or code that may be enabled to utilize the scaled local and global motion vectors and the decoded and/or received pictures to generate the interpolated or inserted pictures. The pictures may be received from a digital decoder, for example, MPEG decoder or from an analog source, for example, an NTSC composite signal. The motion compensated interpolation and auto shut-off block 112 may be enabled to generate a plurality of output pictures based on filtering a generated shut-off value, the generated plurality of interpolated pictures and a repeated pixel value. The shut-off value may be generated based on comparison of the calculated difference with one or more cut-off threshold values. A reduced interpolation mode may be utilized if a generated cut-off value is less than an entry threshold value and/or above an exit threshold value. The cut-off value may be generated based on comparison of the calculated difference with one or more threshold values.

Figure 1B:
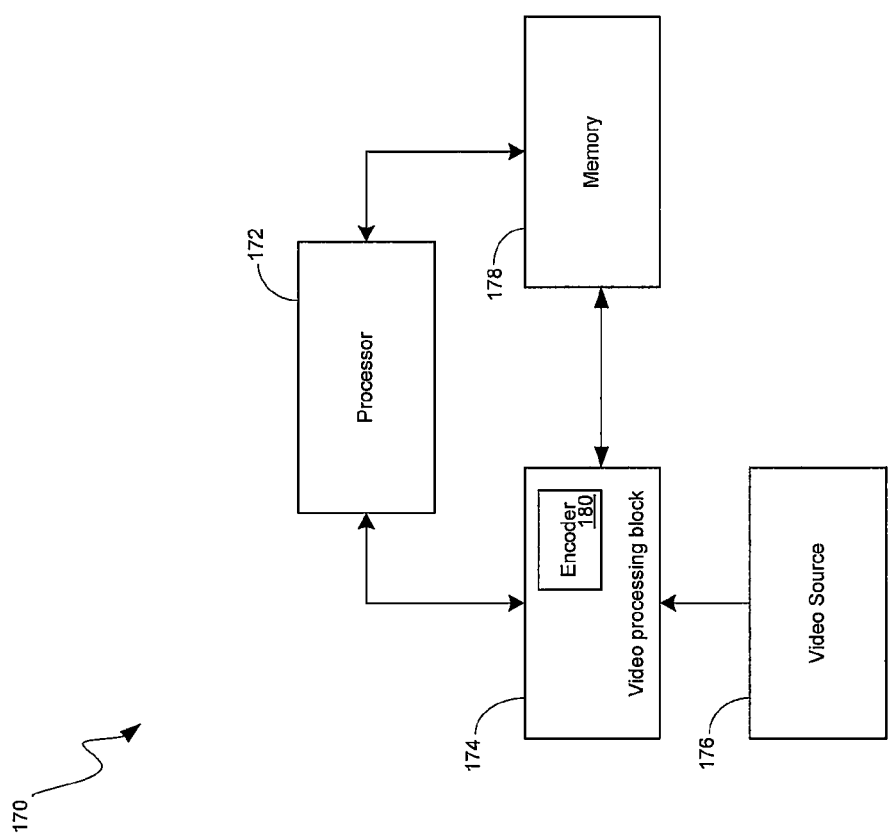
FIG. 1B is a block diagram of an exemplary video processing system for inverse telecine and scene change detection of progressive video, in accordance with an embodiment of the invention.

FIG. 1B is a block diagram of an exemplary video processing system for inverse telecine and scene change detection of progressive video, in accordance with an embodiment of the invention. Referring to FIG. 1B, the exemplary video processing system 170 may comprise a processor 172, a video processing block 174, memory 178, and a video source 176. The video processing block 174 may comprise an encoder 180.

The video source 176 may comprise suitable circuitry, logic, and/or code and may be enabled to communicate raw video stream data to the video processing block 174. The video processing block 174 may comprise suitable circuitry, logic, and/or code and may be enabled to process the raw video data received from the video source 176.

The video processing block 174 may be enabled to determine a cadence, for example, 3:2 or 2:2 pulldown and phase of received progressive input pictures. The processor 172 may be enabled to determine a difference between two or more consecutive received progressive input pictures. The video processing block 174 may be enabled to control motion compensation of a plurality of output pictures based on the determined cadence, phase and difference between two or more consecutive received progressive input pictures. The video processing block 174 may be enabled to determine repeated pictures and scene changes. The video processing block 174 may be enabled to stop motion compensation of output pictures during detected scene changes.

The processor 172 may comprise suitable circuitry, logic, and/or code and may be enabled to control processing of video information by the video processing block 174, for example. The processor 172 may comprise a system or a host processor. The memory 178 may be enabled to store raw or processed video data, such as video data processed by the video processing block 174. Furthermore, the memory 178 may be utilized to store code that may be executed by the processor 172 in connection with video processing tasks performed by the video processing block 174.

Figure 2:
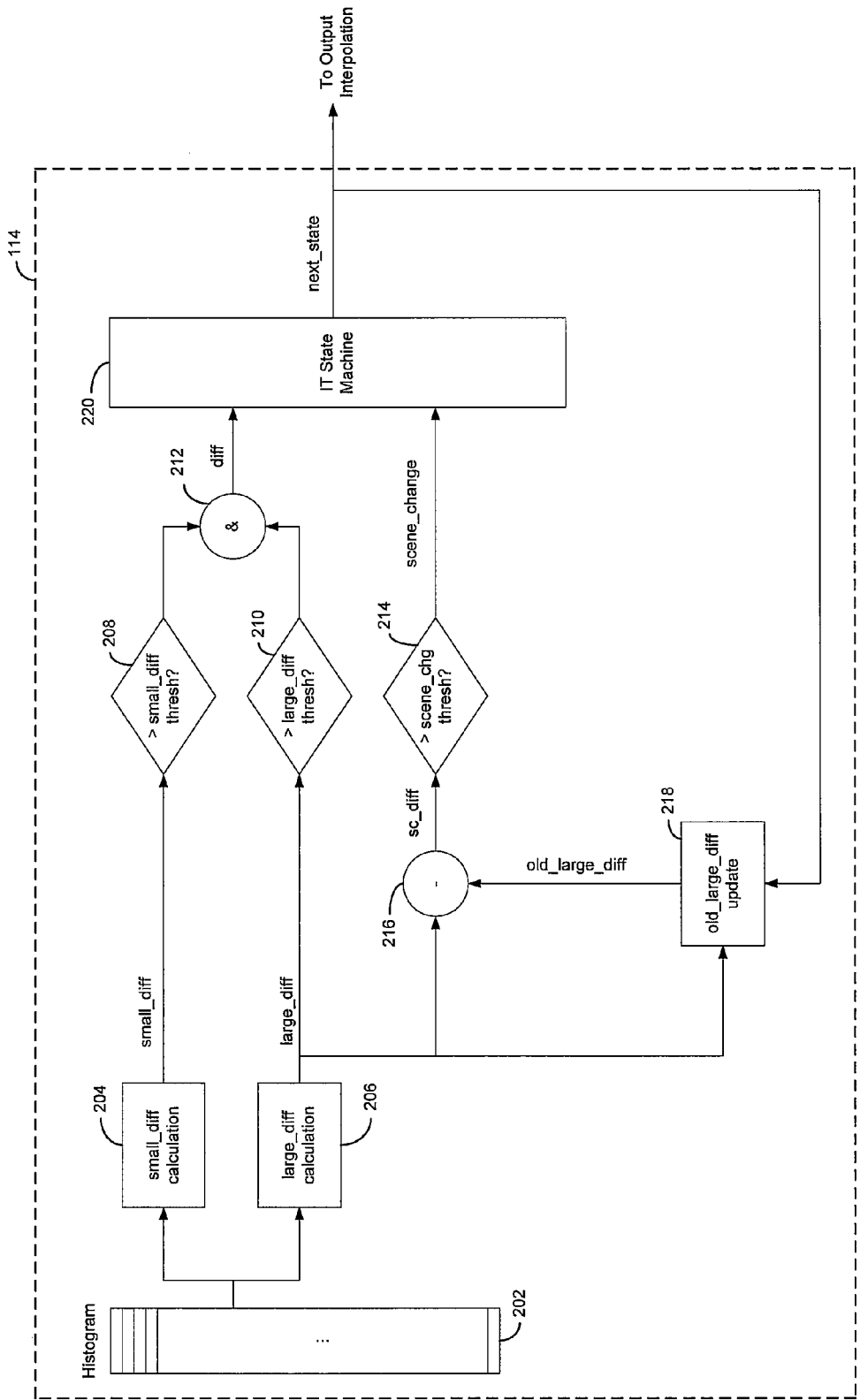
FIG. 2 is a block diagram illustrating exemplary inverse telecine and frame grouping, in accordance with an embodiment of the invention.

FIG. 2 is a block diagram illustrating exemplary inverse telecine and frame grouping, in accordance with an embodiment of the invention. Referring to FIG. 2, there is shown an inverse telecine block 114. The inverse telecine block 114 may comprise a histogram 202, a plurality of difference calculation blocks, small_diff calculation block 204 and large_diff calculation block 206, a plurality of threshold blocks 208, 210 and 214, a subtractor 216, an update block 218, an AND block 212 and an inverse telecine state machine 220.

The inverse telecine block 114 may be enabled to determine a cadence, for example, 3:2 pulldown and 2:2 pulldown and a phase of received progressive input pictures. The inverse telecine block 114 may be enabled to determine a difference between two or more consecutive received progressive input pictures. In accordance with various embodiments of the invention, the inverse telecine block 114 may be enabled to generate a histogram 202 comprising a plurality of threshold values based on the determined difference between the two or more consecutive received progressive input pictures. The plurality of threshold values may be adjusted or programmed based on the determined difference between the two or more consecutive received progressive input pictures.

The inverse telecine block 114 may be enabled to generate the histogram 202 over a particular number of pixels comprising a plurality of threshold values based on the calculated difference, |diff| between two or more consecutive received progressive input pictures. A register may be enabled to store a plurality of threshold values, HISTOGRAM_THRESH_0, HISTOGRAM_THRESH_1, HISTOGRAM_THRESH_2, HISTOGRAM_THRESH_3 and HISTOGRAM_THRESH_4 that may be adjustable or programmable based on the calculated difference, |diff| between two or more consecutive received progressive input pictures.

Table 1 illustrates exemplary allocation of the calculated difference, |diff| between two or more consecutive received progressive input pictures to a corresponding bin based on a plurality of threshold values.

TABLE 1

| | |
|---|---|
| Bin0 | 0 ≦ |diff| < HISTOGRAM_THRESH_0 |
| Bin1 | HISTOGRAM_THRESH_0 + 1 ≦ |diff| < HISTOGRAM_THRESH_1 |
| Bin2 | HISTOGRAM_THRESH_1 + 1 ≦ |diff| < HISTOGRAM_THRESH_2 |
| Bin3 | HISTOGRAM_THRESH_2 + 1 ≦ |diff| < HISTOGRAM_THRESH_3 |
| Bin4 | HISTOGRAM_THRESH_3 + 1 ≦ |diff| < HISTOGRAM_THRESH_4 |
| Bin5 | HISTOGRAM_THRESH_4 ≦ |diff| |

The generated histogram may be reset after the statistics are read and new statistics may be gathered for a next group of lines and/or pixels.

The small_diff calculation block 204 may comprise suitable logic, circuitry and/or code that may be enabled to generate a first difference value, small_diff based on the generated histogram 202. The first difference value, small_diff may be generated based on the generated histogram 202 according to the following equation:

$$small\_diff = Bin1 + 2*Bin2 + 4*Bin3 + 8*Bin4 + 8*Bin5$$

The large_diff calculation block 206 may comprise suitable logic, circuitry and/or code that may be enabled to generate a second difference value, large_diff based on the generated histogram 202. The second difference value, large_diff may be generated based on the generated histogram 202 according to the following equation:

$$\text{large\_diff} = \text{Bin2} + 2*\text{Bin3} + 4*\text{Bin4} + 8*\text{Bin5}$$

The generated small_diff value may provide a measure that may be more sensitive to smaller pixel differences while the generated large_diff value may provide a measure that may be less sensitive to noise due to coding artifacts.

The threshold block 208 may be enabled to compare the generated first difference value, small_diff with a first difference threshold value, small_diff threshold. The threshold block 210 may be enabled to compare the generated second difference value, large_diff with a second difference threshold value, large_diff threshold. The AND block 212 may be enabled to receive the outputs of the threshold blocks 208 and 210 and generate a difference value, diff, to the inverse telecine state machine 220 when the generated first difference value, small_diff may be greater than the first threshold value, small_diff threshold and the generated second difference value, large_diff may be greater than the second threshold value, large_diff threshold.

The inverse telecine block 114 may be enabled to detect a repeated picture of the determined cadence when either the generated first difference value, small_diff may be less than the first threshold value, small_diff threshold or the generated second difference value, large_diff may be less than the second threshold value, large_diff threshold.

The update block 218 may be enabled to receive the current large_diff value from the large_diff calculation block 206 and the previous large_diff value from the output of the inverse telecine state machine 220. The subtractor 216 may be enabled to calculate a difference between the generated second difference value, large_diff and a third difference value or the previous updated large_diff value received from the update block 218. The threshold block 214 may be enabled to compare the calculated difference value, sc_diff with a scene change threshold value, scene_change threshold. The threshold block 214 may be enabled to output a scene_change value to the inverse telecine state machine 220 when the calculated difference value, sc_diff is greater than the scene change threshold value, scene_change threshold.

The inverse telecine block 114 may be enabled to detect a scene change based on the generated scene_change value. The motion compensated interpolation and auto shut-off block 112 may be enabled to stop motion compensation of the plurality of output pictures based on the detected scene change.

Figure 3A:
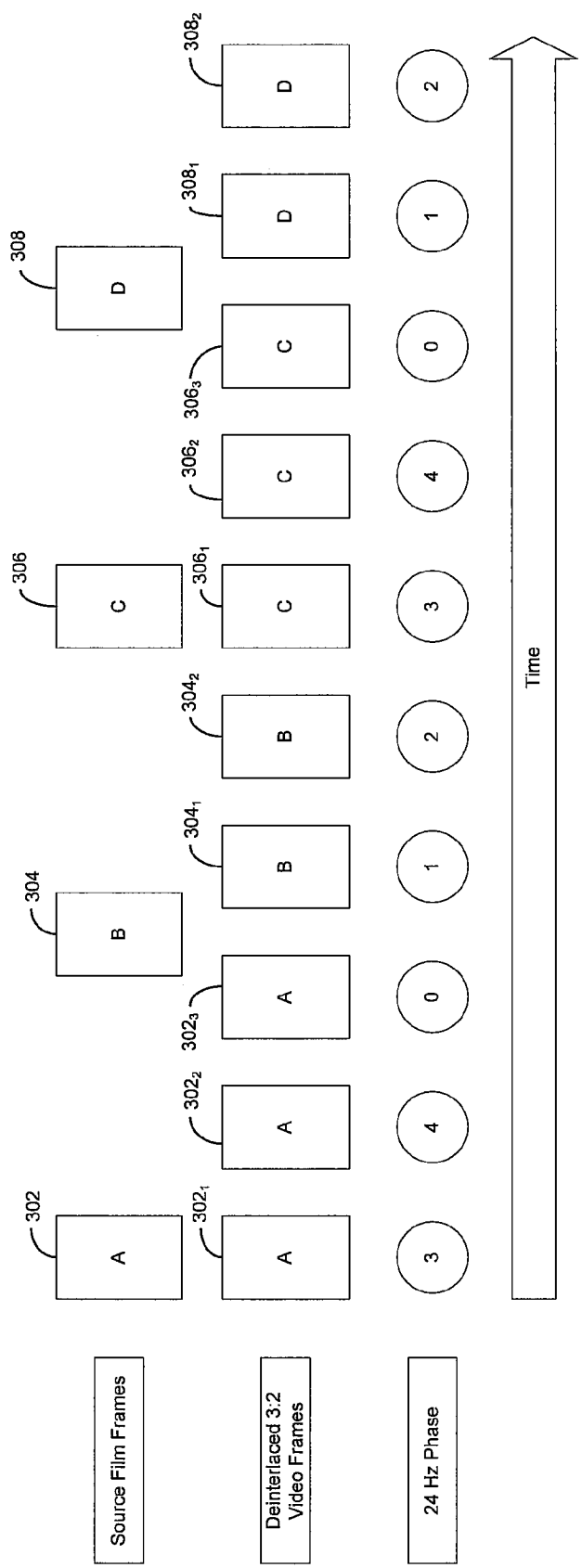
FIG. 3A is a diagram illustrating exemplary 3:2 pulldown that may be utilized for displaying 24 Hz video at 60 Hz, in accordance with an embodiment of the invention.

FIG. 3A is a diagram illustrating exemplary 3:2 pulldown that may be utilized for displaying 24 Hz video at 60 Hz, in accordance with an embodiment of the invention. Referring to FIG. 3A, there is shown a plurality of source film frames A 302, B, 304, C 306 and D 308 and a plurality of corresponding deinterlaced 3:2 video frames A $302_1$ in phase 3, A $302_2$ in phase 4, A $302_3$ in phase 0, B $304_1$ in phase 1, B $304_2$ in phase 2, C $306_1$ in phase 3, C $306_2$ in phase 4, C $306_3$ in phase 0, D $308_1$ in phase 1 and D $308_2$ in phase 2. Notwithstanding, the words frame and picture may be utilized interchangeably throughout this disclosure.

The inverse telecine block 114 may be enabled to determine a cadence, for example, 3:2 pulldown and a phase of received progressive input pictures A 302, B, 304, C 306 and D 308. The inverse telecine block 114 may be enabled to determine a difference between two or more consecutive received progressive input pictures, for example, A 302 and B, 304. The inverse telecine block 114 may be enabled to compensate for 24 Hz video in a NTSC source.

Figure 3B:
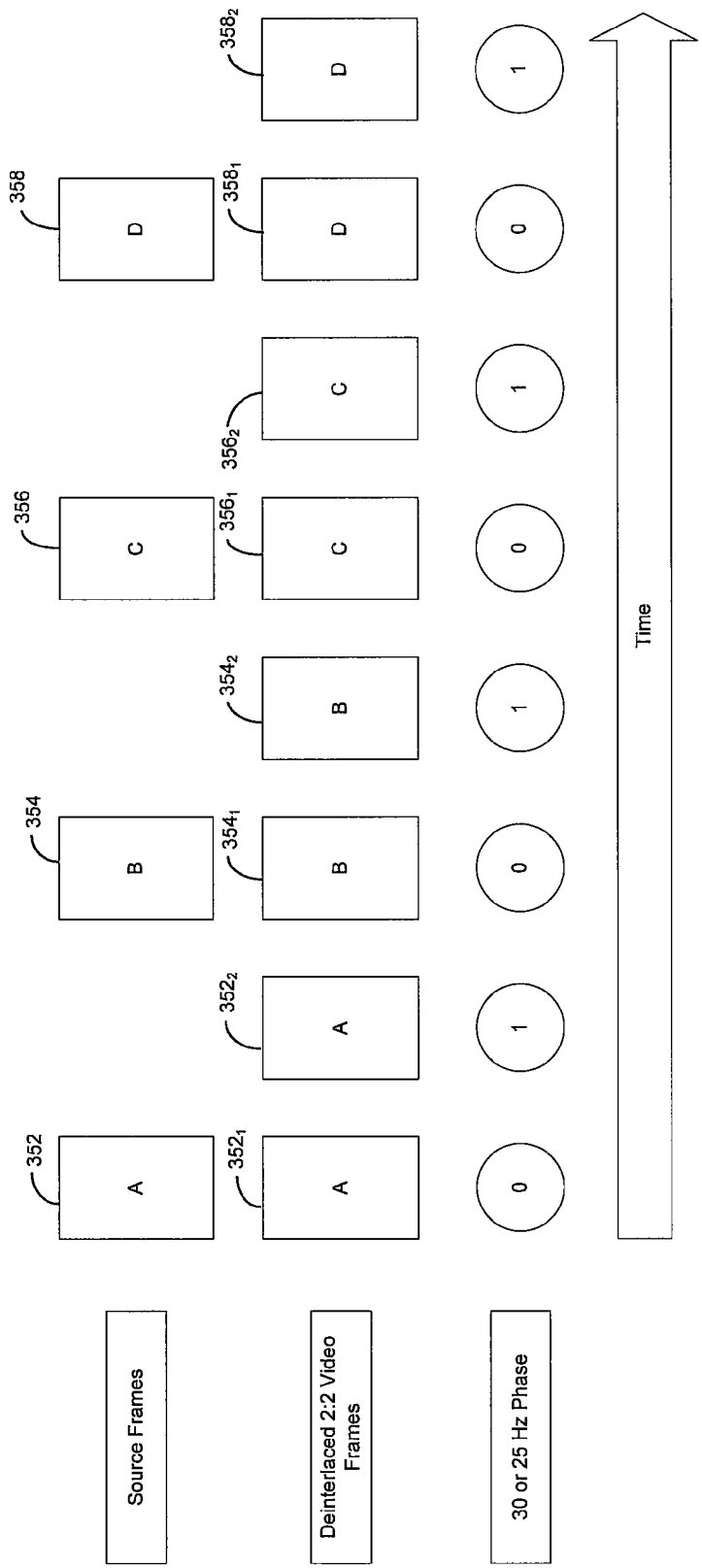
FIG. 3B is a diagram illustrating exemplary 2:2 pulldown that may be utilized for displaying 30 Hz video at 60 Hz or 25 Hz video at 50 Hz, in accordance with an embodiment of the invention.

FIG. 3B is a diagram illustrating exemplary 2:2 pulldown that may be utilized for displaying 30 Hz video at 60 Hz or 25 Hz video at 50 Hz, in accordance with an embodiment of the invention. Referring to FIG. 3B, there is shown a plurality of source frames A 352, B, 354, C 356 and D 358 and a plurality of corresponding deinterlaced 2:2 video frames A $352_1$ in phase 0, A $352_2$ in phase 1, B $354_1$ in phase 0, B $354_2$ in phase 1, C $356_1$ in phase 0, C $356_2$ in phase 1, D $358_1$ in phase 0 and D $358_2$ in phase 1.

The inverse telecine block 114 may be enabled to determine a cadence, for example, 2:2 pulldown and a phase of received progressive input pictures A 352, B, 354, C 356 and D 358. The inverse telecine block 114 may be enabled to determine a difference between two or more consecutive received progressive input pictures, for example, A 352 and B, 354. The inverse telecine block 114 may be enabled to compensate for 30 Hz video in a NTSC source or 25 Hz video in a PAL source.

Figure 4:
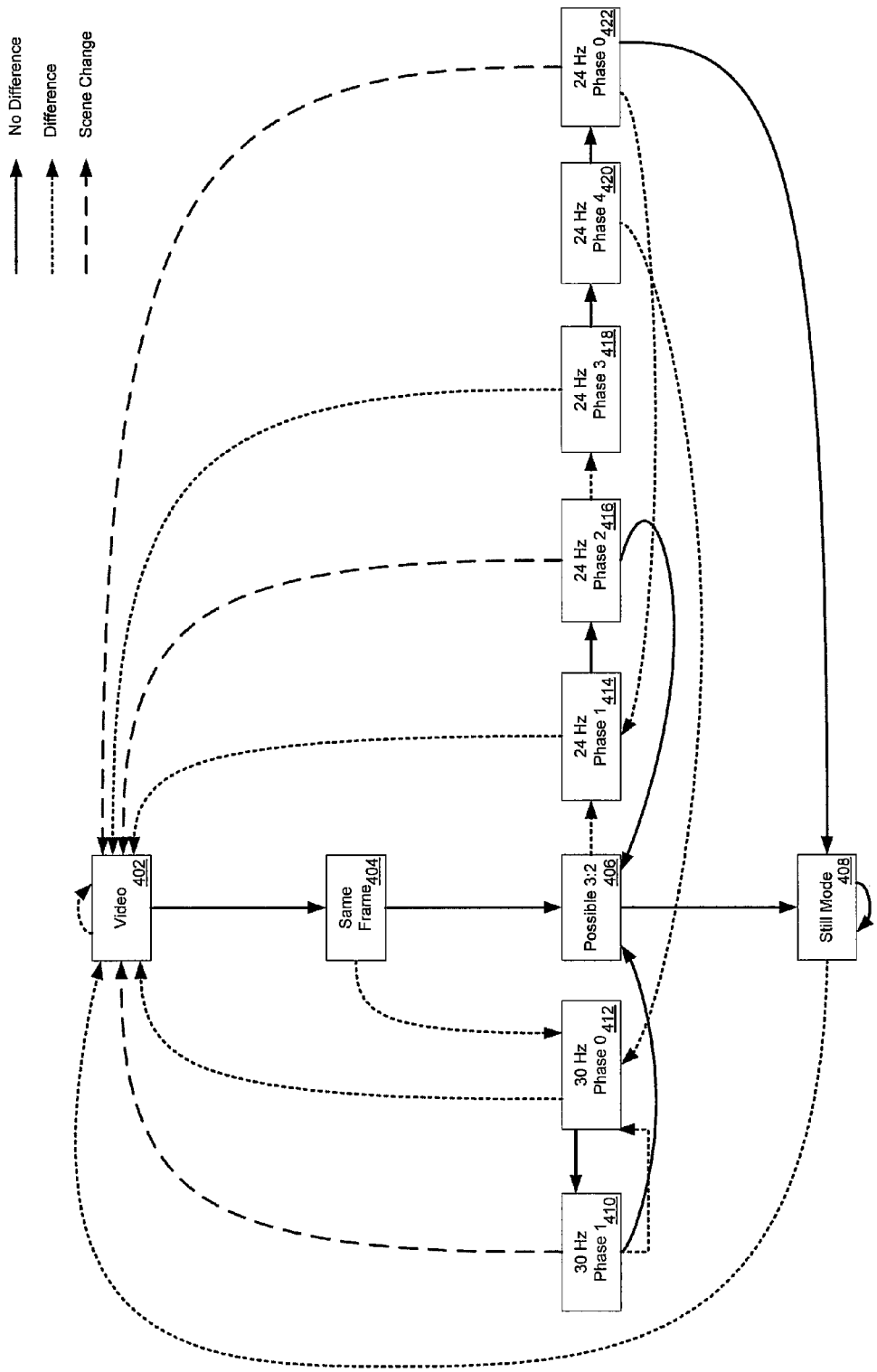
FIG. 4 is an exemplary state machine diagram illustrating inverse telecine and scene change detection of progressive video, in accordance with an embodiment of the invention.

FIG. 4 is an exemplary state machine diagram illustrating inverse telecine and scene change detection of progressive video, in accordance with an embodiment of the invention. Referring to FIG. 4, there is shown a plurality of states, video state 402, same frame state 404, possible 3:2 state 406, still mode state 408, 30 Hz phase 1 state 410, 30 Hz phase 0 state 412, 24 Hz phase 1 state 414, 24 Hz phase 2 state 416, 24 Hz phase 3 state 418, 24 Hz phase 4 state 420 and 24 Hz phase 0 state 422.

The inverse telecine state machine 220 may receive two inputs, for example, the difference value, diff, and the scene change difference value, scene_change. Table 1 illustrates a corresponding state transition for various diff and scene_change values.

TABLE 1

| scene_change | diff | State Transition |
|---|---|---|
| 0 | 0 | No Difference |
| 0 | 1 | Difference |
| 1 | 0 | N/A |
| 1 | 1 | Scene Change |

In video state 402, when a difference may be detected between two or more consecutive received progressive input pictures, control continues in the video state 402. When no difference may be detected between two or more consecutive received progressive input pictures, control passes to the same frame state 404. In the same frame state 404, in instances where no difference may be detected, control passes to possible 3:2 state 406. In same frame state 404, in instances where a difference may be detected, control passes to 30 Hz phase 0 state 412.

In possible 3:2 state 406, in instances where no difference may be detected, control passes to still mode state 408. In possible 3:2 state 406, in instances where a difference may be detected, control passes to 24 Hz phase 1 state 414. In still mode state 408, in instances where no difference may be detected, control continues in the still mode state 408. In still mode state 408, in instances where a difference may be detected, control returns to video state 402.

In 30 Hz phase 1 state 410, in instances where a difference may be detected, control passes to 30 Hz phase 0 state 412. In 30 Hz phase 1 state 410, in instances where a scene change may be detected between two or more consecutive received progressive input pictures, control passes to video state 402. In 30 Hz phase 0 state 412, in instances where no difference may be detected, control passes to 30 Hz phase 1 state 410. In 30 Hz phase 0 state 412, in instances where a difference may be detected, control returns to video state 402.

In 24 Hz phase 1 state 414, in instances where no difference may be detected, control passes to 24 Hz phase 2 state 416. In 24 Hz phase 1 state 414, in instances where a difference may be detected, control returns to video state 402. In 24 Hz phase 2 state 416, in instances where a difference may be detected, control passes to 24 Hz phase 3 state 418. In 24 Hz phase 2 state 416, in instances where a scene change may be detected, control passes to video state 402. In 24 Hz phase 3 state 418, in instances where no difference may be detected, control passes to 24 Hz phase 4 state 420. In 24 Hz phase 3 state 418, in instances where a difference may be detected, control returns to video state 402. In 24 Hz phase 4 state 420, in instances where no difference may be detected, control passes to 24 Hz phase 0 state 422. In 24 Hz phase 4 state 420, in instances where a difference may be detected, control passes to step 30 Hz phase 0 state 412. In 24 Hz phase 0 state 422, in instances where no difference may be detected, control passes to still mode state 408. In 24 Hz phase 0 state 422, in instances where a difference may be detected, control passes to 24 Hz phase 1 state 414. In 24 Hz phase 0 state 422, in instances where a scene change may be detected, control passes to video state 402.

Figure 5A:
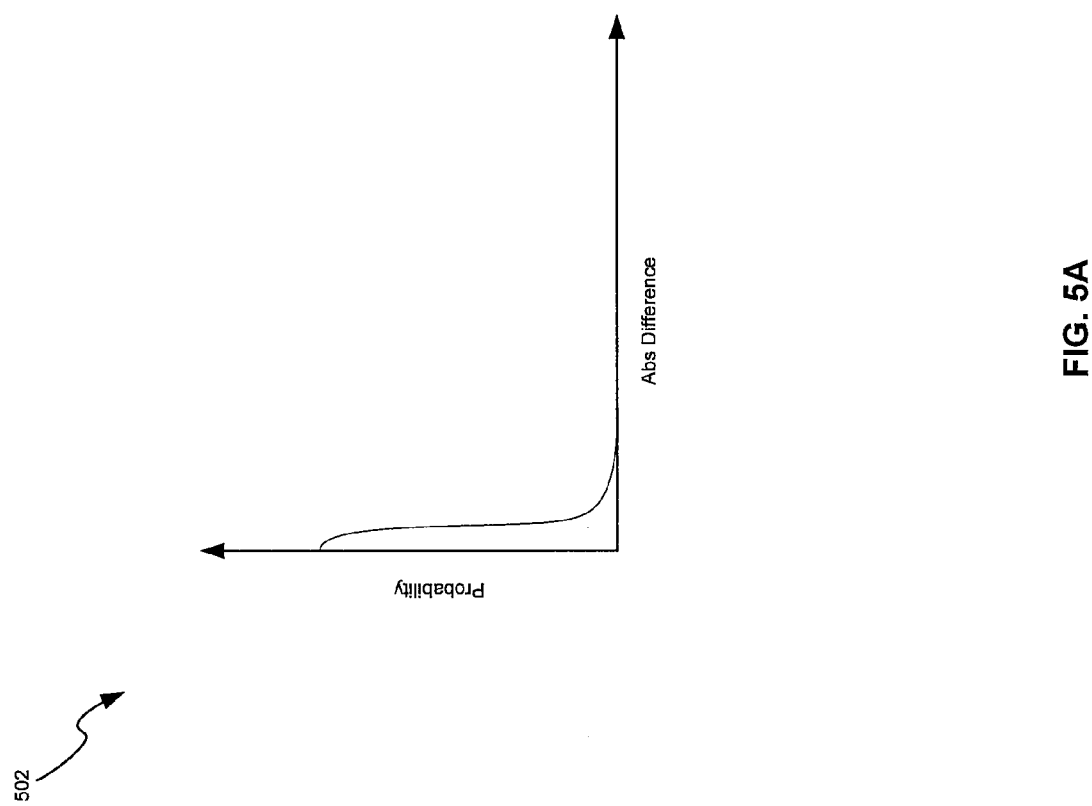
FIG. 5A is a graph illustrating exemplary absolute pixel difference distribution for a repeated pixel, in accordance with an embodiment of the invention.

FIG. 5A is a graph illustrating exemplary absolute pixel difference distribution for a repeated pixel, in accordance with an embodiment of the invention. Referring to FIG. 5A, there is shown a graph 502 illustrating absolute pixel difference distribution for a repeated pixel.

The inverse telecine block 114 may be enabled to determine a difference between two or more consecutive received progressive input pictures. The inverse telecine block 114 may be enabled to measure the probability distribution of absolute pixel differences. The absolute difference may be calculated according to the following equation based on luma components:

$$absdiff=abs(PIX\_A-PIX\_B)$$

where PIX_A may be a pixel in the current subsampled input frame and PIX_B may be a collocated pixel in a previous subsampled input frame. The inverse telecine block 114 may be enabled to detect a repeated frame when the probability distribution of absolute pixel differences is similar to the distribution illustrated in graph 502.

Figure 5B:
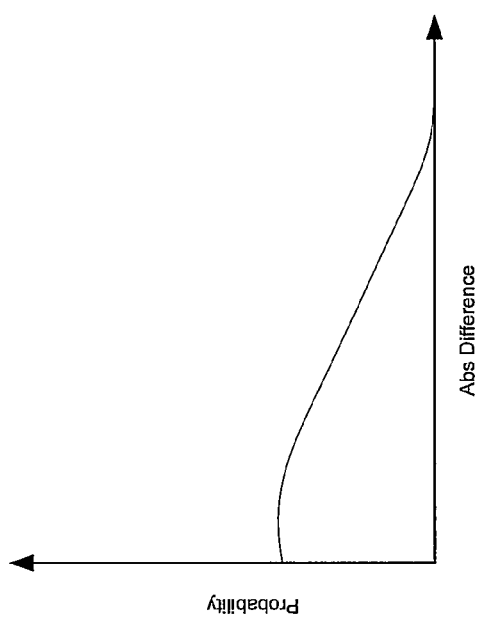
FIG. 5B is a graph illustrating exemplary absolute pixel difference distribution for non-repeated frames, in accordance with an embodiment of the invention.
Figure 5B:
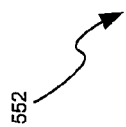

FIG. 5B is a graph illustrating exemplary absolute pixel difference distribution for non-repeated frames, in accordance with an embodiment of the invention. Referring to FIG. 5B, there is shown a graph 552 illustrating absolute pixel difference distribution for a non-repeated pixel. The inverse telecine block 114 may be enabled to detect a non-repeated frame when the probability distribution of absolute pixel differences is similar to the distribution illustrated in graph 552.

Figure 6:
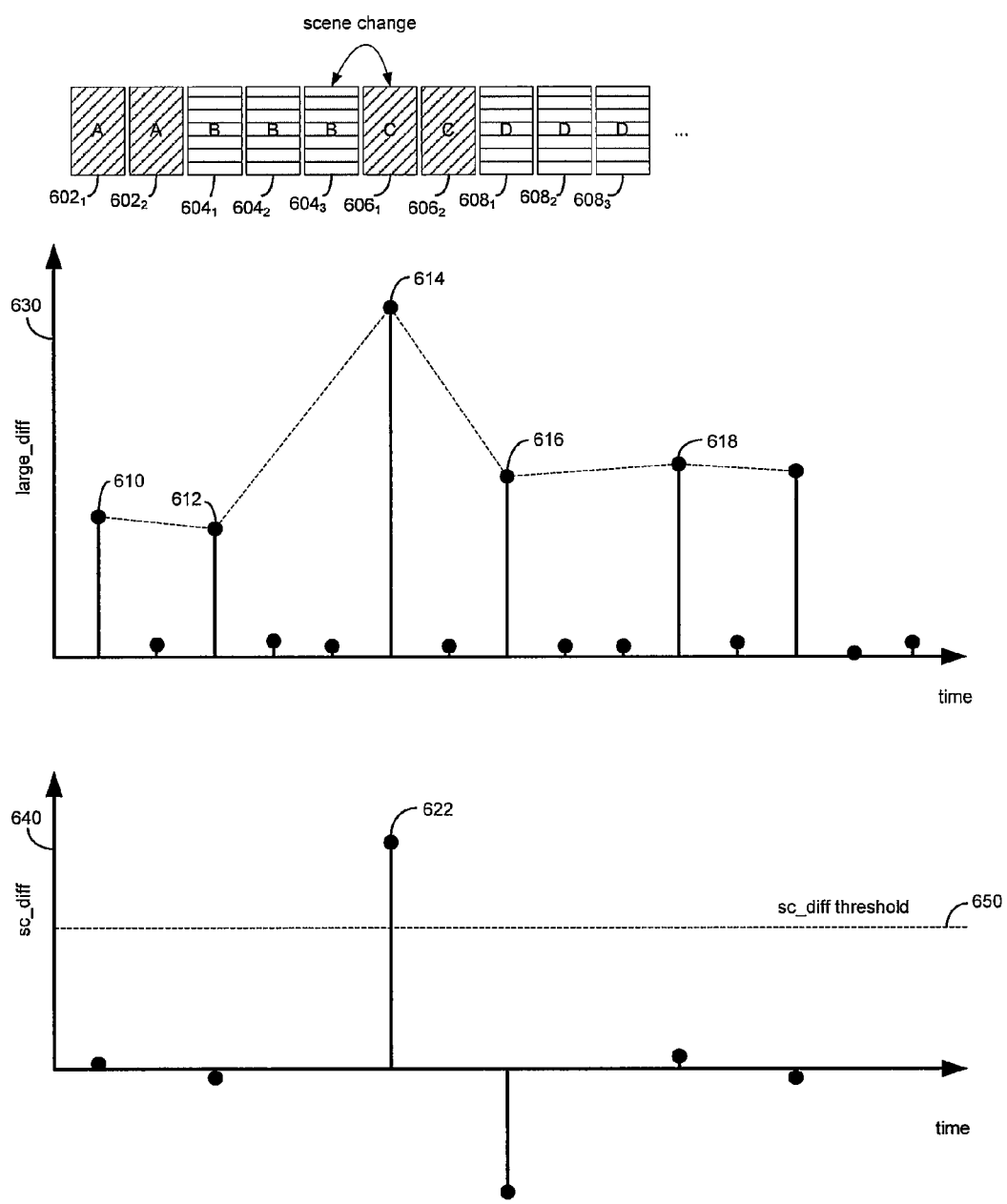
FIG. 6 is a block diagram illustrating exemplary scene change detection, in accordance with an embodiment of the invention.

FIG. 6 is a block diagram illustrating exemplary scene change detection, in accordance with an embodiment of the invention. Referring to FIG. 6, there is shown a plurality of deinterlaced 3:2 video input pictures A $602_1$, A $602_2$, B $604_1$, B $604_2$, B $604_3$, C $606_1$, C $606_2$, D $608_1$, D $608_2$ and D $608_3$, a graph 630 of large_diff values over time and a graph 640 of scene change difference values over time.

The scene change difference value may be calculated by subtracting the generated second difference value, large_diff and a third difference value or the previous updated large_diff value. The plurality of large_diff values 610, 612, 614, 616, and 618 may be generated corresponding to difference between consecutive received progressive input pictures a previous input picture and A $602_1$, A $602_2$ and B $604_1$, B $604_3$ and C $606_1$, C $606_2$ and D $608_1$ and D $608_3$ and a next input picture respectively. The scene change difference value 622 may correspond to a scene change between B $604_3$ and C $606_1$. The inverse telecine block 114 may be enabled to compare the calculated difference value, sc_diff 622 with a scene change threshold value, scene change threshold 650. The inverse telecine block 114 may be enabled to output a scene_change value to the inverse telecine state machine 220 when the calculated difference value, sc_diff 622 is greater than the scene change threshold value, scene_change threshold 650. During the scene change between B $604_3$ and C $606_1$, the large_diff value 614 may be significantly larger compared to the other large_diff values corresponding to non-scene change frames. The motion compensated interpolation and auto shut-off block 112 may be enabled to stop motion compensation of the plurality of output pictures based on the detected scene change.

In accordance with an embodiment of the invention, the inverse telecine block 114 may be enabled to compare differences between original 24 Hz, 25 Hz and/or 30 Hz frames and ignore differences between repeated frames. For example, in a 24 Hz cadence, 2 out of 5 large_diff values may be expected to be non-zero. The update block 218 may be enabled to update the old_large_diff value after 24 Hz phase 1, 24 Hz phase 3, and 30 Hz phase 1, for example. The old_large_diff may be reset back to its maximum value in the video state 402 so that scene change detection may not trigger during a first 3:2 or 2:2 pulldown input sequence.

Figure 7:
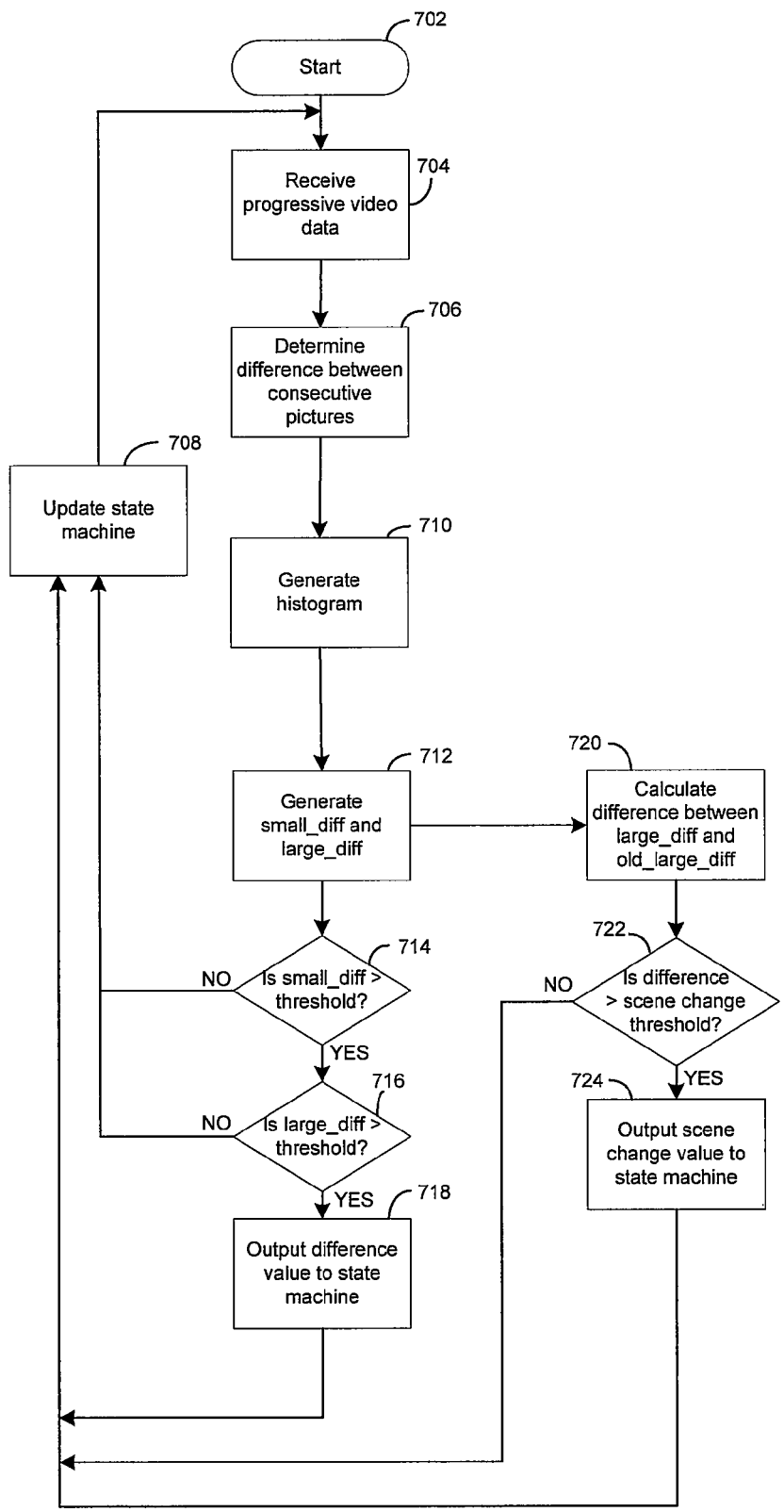
FIG. 7 is a flowchart illustrating exemplary steps for inverse telecine and scene change detection of progressive video, in accordance with an embodiment of the invention.

FIG. 7 is a flowchart illustrating exemplary steps for inverse telecine and scene change detection of progressive video, in accordance with an embodiment of the invention. Referring to FIG. 7, exemplary steps may begin at step 702. In step 704, the inverse telecine block 114 may be enabled to receive progressive input pictures. In step 706, a difference between two or more consecutive received progressive input pictures may be determined. In step 710, a histogram 202 comprising a plurality of threshold values may be generated based on the determined difference between the two or more consecutive received progressive input pictures.

In step 712, the small_diff calculation block 204 may be enabled to generate a first difference value, small_diff based on the generated histogram 202. The large_diff calculation block 204 may be enabled to generate a second difference value, large_diff based on the generated histogram 202 based on the generated histogram 202. In step 714, it may be determined whether the generated first difference value, small_diff may be greater than a first difference threshold value, small_diff threshold. In instances where the generated first difference value, small_diff may be greater than the first difference threshold value, small_diff threshold, control passes to step 716. In instances where the generated first difference value, small_diff may not be greater than the first difference threshold value, small_diff threshold, control passes to update step 708. In step 708, the state machine may be updated with the current small_diff value. Control then returns to step 704.

In step 716, it may be determined whether the generated second difference value, large_diff may be greater than a second difference threshold value, large_diff threshold. In instances where the generated second difference value, large_diff may not be greater than a second difference threshold value, large_diff threshold, control passes to update step 708. In step 708, the state machine may be updated with the current large_diff value. Control then returns to step 704.

In instances where the generated second difference value, large_diff may be greater than a second difference threshold value, large_diff threshold, control passes to step 718. In step 718, a difference value may be generated and output to the inverse telecine state machine 220. Control then passes to step 708. In step 708, the state machine may be updated with the difference value. In step 720, a scene change difference value, large_diff between the generated second difference value, large_diff and the previous updated large_diff value may be calculated. In step 722, it may be determined whether the calculated scene change difference value may be greater than a scene change threshold value. In instances where the calculated scene change difference value may not be greater than a scene change threshold value, control passes to step 708. In step 708, the state machine may be updated with the current scene change difference value. Control then returns to step 704.

In instances where the calculated scene change difference value may be greater than a scene change threshold value, control passes to step 724. In step 724, the calculated scene change difference value may be output to the inverse telecine state machine 220. Control then passes to step 708. In step 708, the state machine may be updated with the current scene change difference value. Control then returns to step 704.

In accordance with an embodiment of the invention, a method and system for inverse telecine and scene change detection of progressive video may comprise an inverse telecine block 114 that may be enabled to determine a cadence, for example, 3:2 pulldown and 2:2 pulldown and a phase of received progressive input pictures. The inverse telecine block 114 may be enabled to determine a difference between two or more consecutive received progressive input pictures. The motion compensated interpolation and auto shut-off block 112 may be enabled to control motion compensation of a plurality of output pictures based on the determined cadence, phase and difference between the two or more consecutive received progressive input pictures.

The inverse telecine block 114 may be enabled to generate a histogram 202 comprising a plurality of threshold values based on the determined difference between the two or more consecutive received progressive input pictures. The plurality of threshold values may be adjusted or programmed based on the determined difference between the two or more consecutive received progressive input pictures.

The small_diff calculation block 204 may be enabled to generate a first difference value, small_diff based on the generated histogram 202. The large_diff calculation block 206 may be enabled to generate a second difference value, large_diff based on the generated histogram 202. The threshold block 208 may be enabled to compare the generated first difference value, small_diff with a first difference threshold value, small_diff threshold. The threshold block 210 may be enabled to compare the generated second difference value, large_diff with a second difference threshold value, large_diff threshold.

The inverse telecine block 114 may be enabled to generate a difference value when the generated first difference value, small_diff may be greater than the first threshold value, small_diff threshold and the generated second difference value, large_diff may be greater than the second threshold value, large_diff threshold. The inverse telecine block 114 may be enabled to detect a repeated picture of the determined cadence when either the generated first difference value, small_diff may be less than the first threshold value, small_diff threshold or the generated second difference value, large_diff may be less than the second threshold value, large_diff threshold. The subtractor 216 maybe enabled to calculate a difference between the generated second difference value, large_diff and a third difference value or the previous updated large_diff value. The inverse telecine block 114 may be enabled to detect a scene change when the calculated difference between the generated second difference value, large_diff and the third difference value or the previous updated large_diff value may be above a scene change threshold value. The motion compensated interpolation and auto shut-off block 112 may be enabled to stop motion compensation of the plurality of output pictures based on the detected scene change.

Another embodiment of the invention may provide a machine-readable storage, having stored thereon, a computer program having at least one code section executable by a machine, thereby causing the machine to perform the steps as described herein for automatically turning off motion compensation when motion vectors are inaccurate.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
   determining a cadence and phase of received progressive input pictures;
   determining a difference between two or more consecutive ones of said received progressive input pictures;
   controlling motion compensation interpolation of a plurality of output pictures based on said determined cadence, phase and difference between said two or more consecutive received progressive input pictures; and
   based on said controlling of said motion compensation interpolation, generating one or more interpolated pictures from said plurality of output pictures in the absence of a detected scene change.

2. The method according to claim 1, wherein said determined cadence of said received progressive input pictures comprises one or both of: 3:2 pulldown and 2:2 pulldown.

3. The method according to claim 1, comprising generating a histogram comprising a plurality of threshold values based on said determined difference between said two or more consecutive received progressive input pictures.

4. The method according to claim 3, comprising adjusting said plurality of threshold values based on said determined difference between said two or more consecutive received progressive input pictures.

5. The method according to claim 3, comprising generating a first difference value and a second difference value based on said generated histogram.

6. The method according to claim 5, comprising comparing said generated first difference value with a first difference threshold value.

7. The method according to claim 6, comprising comparing said generated second difference value with a second difference threshold value.

8. The method according to claim 7, comprising generating a difference value when said generated first difference value is greater than said first threshold value and said generated second difference value is greater than said second threshold value.

9. The method according to claim 7, comprising detecting a repeated picture of said determined cadence when said generated first difference value is less than said first threshold value or said generated second difference value is less than said second threshold value.

10. The method according to claim 5, comprising:
calculating a difference between said generated second difference value and a third difference value; and
detecting a scene change when said calculated difference between said generated second difference value and said third difference value is above a scene change threshold value.

11. The method according to claim 10, comprising stopping said motion compensation interpolation of said plurality of output pictures based on said detected scene change.

12. The method according to claim 1, comprising selecting said two or more consecutive ones of said received progressive input pictures and a location of said plurality of output pictures based on said determined phase.

13. A system for processing video data, the system comprising:
one or more circuits that enables determination of a cadence and phase of received progressive input pictures;
said one or more circuits enables determination of a difference between two or more consecutive ones of said received progressive input pictures; and
said one or more circuits enables controlling motion compensation interpolation of a plurality of output pictures based on said determined cadence, phase and difference between said two or more consecutive received progressive input pictures.

14. The system according to claim 13, wherein said determined cadence of said received progressive input pictures comprises one or both of: 3:2 pulldown and 2:2 pulldown.

15. The system according to claim 13, wherein said one or more circuits enables generation of a histogram comprising a plurality of threshold values based on said determined difference between said two or more consecutive received progressive input pictures.

16. The system according to claim 15, wherein said one or more circuits enables adjustment of said plurality of threshold values based on said determined difference between said two or more consecutive received progressive input pictures.

17. The system according to claim 15, wherein said one or more circuits enables generation of a first difference value and a second difference value based on said generated histogram.

18. The system according to claim 17, wherein said one or more circuits enables comparison of said generated first difference value with a first difference threshold value.

19. The system according to claim 18, wherein said one or more circuits enables comparison of said generated second difference value with a second difference threshold value.

20. The system according to claim 19, wherein said one or more circuits enables generation of a difference value when said generated first difference value is greater than said first threshold value and said generated second difference value is greater than said second threshold value.

21. The system according to claim 19, wherein said one or more circuits enables detection of a repeated frame when said generated first difference value is less than said first threshold value or said generated second difference value is less than said second threshold value.

22. The system according to claim 17, wherein said one or more circuits enables:
calculation of a difference between said generated second difference value and a third difference value; and
detection of a scene change when said calculated difference between said generated second difference value and said third difference value is above a scene change threshold value.

23. The system according to claim 22, wherein said one or more circuits enables stopping said motion compensation interpolation of said plurality of output pictures based on said detected scene change.

24. The system according to claim 13, wherein said one or more circuits enables selection of said two or more consecutive ones of said received progressive input pictures and a location of said plurality of output pictures based on said determined phase.

25. A machine-readable storage having stored thereon, a computer program having at least one code section for processing video data, the at least one code section being executable by a machine for causing the machine to perform steps comprising:
determining a cadence and phase of received progressive input pictures;
determining a difference between two or more consecutive said received progressive input pictures;
generating a histogram based on said determined difference;
generating difference values based on said histogram;
detecting a scene change based on said difference values; and
controlling motion compensation interpolation of a plurality of output pictures based on said determined cadence, phase and difference between said two or more consecutive received progressive input pictures, wherein said controlling further comprises disabling said motion compensation interpolation of said plurality of output pictures based on said detected scene change.

* * * * *